Jan. 17, 1967 C. D. GRABER ET AL 3,298,766
POWER FILE EJECTOR CONSTRUCTION
Filed Aug. 23, 1965 7 Sheets-Sheet 1

INVENTORS
CARL D. GRABER and
LEO J. GROSSWILLER, JR.
BY
Frease, Bishop & Schick
ATTORNEYS INVENTORS
CARL D. GRABER and
LEO J. GROSSWILLER, JR.
BY
Frease, Bishop & Schick
ATTORNEYS Jan. 17, 1967  C. D. GRABER ET AL  3,298,766
POWER FILE EJECTOR CONSTRUCTION
Filed Aug. 23, 1965  7 Sheets-Sheet 4

INVENTORS
CARL D. GRABER and
LEO J. GROSSWILLER, JR.
BY
Frease, Bishop & Schick
ATTORNEYS

INVENTORS
CARL D. GRABER and
LEO J. GROSSWILLER, JR.
BY
*Frease, Bishop & Schick*
ATTORNEYS Jan. 17, 1967 C. D. GRABER ET AL 3,298,766
POWER FILE EJECTOR CONSTRUCTION
Filed Aug. 23, 1965 7 Sheets-Sheet 6

INVENTORS
CARL D. GRABER and
LEO J. GROSSWILLER, JR.
BY
Frease, Bishop & Schick
ATTORNEYS

INVENTORS
CARL D. GRABER and
LEO J. GROSSWILLER, JR.

BY

*Frease, Bishop & Schick*

ATTORNEYS

3,298,766
POWER FILE EJECTOR CONSTRUCTION

Carl D. Graber, Orrville, and Leo J. Grosswiller, Jr., East Canton, Ohio, assignors to Diebold Incorporated, Canton, Ohio, a corporation of Ohio
Filed Aug. 23, 1965, Ser. No. 481,857
6 Claims. (Cl. 312—223)

The invention comprises improvements upon the construction shown in the copending application of Krug et al. filed Apr. 8, 1965, Ser. No. 446,682; and the invention relates to mechanized elevator or power filing appliances of a type in which a plurality of pans are mounted on an endless conveyor for movement in either direction in a continuous orbit of travel and any selected pan is delivered by power means at a work station, and in which a drawer, which may be latched in closed or retracted position, is supported on each pan on suspension mechanism which permits the drawer to be moved between retracted and extended positions at the work station; and more particularly the invention relates to improved drawer-moving mechanism power operated to eject to extend position and to retract to normal or latched position a drawer on suspension mechanism of a pan-drawer assembly located at the work station.

The drawer-moving mechanism for power ejection and power retraction of the drawer of any pan-drawer assembly located at a work station of a power file disclosed in said application Ser. No. 446,682 includes multiple rack segments and a dual small-large pinion engageable selectively with the rack segments to produce slow-fast-slow movement of a drawer on its pan during power operated ejection or retraction. The power operated drawer-moving mechanism also includes magnet means for detachable coupling with the drawer being moved.

Several difficulties have been experienced in the construction and operation of such prior drawer-moving mechanisms. First of all, the manufacture of the rack segments and the dual small-large pinions engageable selectively with the rack segments is extremely difficult and expensive because of the close limits which must be maintained in forming the pinion and rack gear teeth profiles and their relative locations so as to insure smooth drive transmission in the transition between small pinion engagement with one rack and large pinion engagement with another rack, and vice versa, for speed change.

Furthermore, the double rack, dual pinion drive involves a number of abrupt speed changes in movement of the drawer during each cycle of operation, including abrupt changes when moving the drawer from at rest to slow speed movement, from slow speed movement to high speed movement, from high speed movement to slow speed movement and from slow speed movement to at rest when ejected. The same abrupt speed changes occur during power operated drawer retraction with the drawer coupled by magnet means with the power operated drawer-moving mechanism. These abrupt speed changes involve substantial power or energy requirements for drawer movement to eject or retract any drawer as well as for energizing the coupling magnet.

Accordingly, objects of the present invention are to provide a new drawer-moving mechanism for a power file of the type described which eliminates a multiple-rack dual-pinion drive; which eliminates abrupt speed changes during power operated ejection or retraction drawer movement; which enable twice the drawer load to be moved with the same energy as compared with prior constructions; which may be located and operated in a power file within the small and confined space limitations available without altering the power file size or the floor space occupied by the file; which provides for smooth, gentle and gradual acceleration, then rapid movement, and then smooth, gentle and gradual deceleration during drawer movement; and which eliminates difficulties heretofore encountered in the art, achieves the stated objects in a simple, effective and inexpenive manner, and solves problems and satisfies needs existing in the art.

These and other objects and advantages apparent to those skilled in the art from the following description and claims may be obtained, the stated results achieved, and the described difficulties overcome, by the apparatus, combinations, parts, elements, subcombinations, arrangements and constructions which comprise the present invention, the nature of which is set forth in the following general statement, a preferred embodiment of which— illustrative of the best mode in which applicants have contemplated applying the principles—is set forth in the following description and shown in the drawings, and which are particularly and distinctly pointed out and set forth in the appended claims forming part hereof.

The nature of the improved power file ejector construction for power files of the type described may be stated in general terms as including drawer-moving mechanism, means mounting said mechanism on the support means of a power file at a location between opposed flights of orbital travel of the endless conveyer mechanism for the file; the drawer-moving mechanism including slide bar means movable generally in a direction between home and extended positions parallel with the axes of the orbital path of conveyor travel; means for imparting slow-fast-slow movement in either direction to the slide bar means including reversing motor drive means, an oscillating crank operatively connected with the crank and slide bar means; a column-acting, force transmitting coil spring means thrustor connected at one end to the slide bar means having a magnet adapted for magnetic coupling at its other end with a drawer of any pan-drawer assembly located at the work station; means for directing thrust movement of said thrustor magnet in a direction normal to the plane of at least one of the flights of conveyer travel; and control means for operating the reversing motor drive means.

By way of example, an embodiment of the improved power file ejector construction is shown in the accompanying drawings forming part hereof in which.

Similar numerals refer to similar parts throughout the various figures of the drawings.

The improved ejector-retractor mechanism for power files is illustrated and described in the drawings in connection with a power file of the general type shown in Krug et al. Patent No. 3,166,366. The improved mechanism also replaces the multiple-rack, dual-pinion drawer-moving mechanism shown in said application Serial No. 446,682.

A power file is indicated generally at 1 and may include a housing or cabinet 2, the front wall of which may be provided with an access opening 3 adapted to be closed by a door 4, the opening 3 being located above a counter or work station 5. A pair of conveyer chains 6 are trained over sprockets 7 and 7a mounted on upright support members 8 carried at 9 within housing 2 and mount a series of pans 10 for movement in either direction in a continuous orbit of travel.

Each pan 10 is mounted at each end on a pair of arms 11 fixed to a chain 6, and the arms 11 pivotally support an end of a pan 10 at 12. A stabilizing arm 13 is fixed to each end of each pan 10 having a roller 14 at its other end. Rollers 14 engage and are guided in movement around the upper and lower ends of the path of conveyer travel by semicircular guide channels 15 and 16 to maintain pans 10 in a horizontal position throughout the upper and lower ends of the orbit of travel on conveyer 6 when travelling around the sprockets 7 and 7a. Horizontal positioning of the pans 10 is maintained during travel in the vertical flights between sprockets 7 and 7a by engagement of a V-ear 17 at each end of one pan with the pivot shafts 12 of the pan next below.

Conveyer 6 is driven in a suitable manner from drive motor 18 (FIG. 4) which may be a reversing motor, operated preferably by selector switches and a rotary selector control switch, not shown, of a type such as disclosed in Patent No. 3,198,894. The construction and operation of the conveyer, housing, etc. also briefly described herein may be of the type shown in Patent No. 3,199,658.

Power files such as shown in Patents Nos. 3,166,366, 3,198,894, and 3,199,658 comprise a plurality of pans mounted on an endless conveyer for movement in either direction in a continuous orbit of travel. Any selected pan may be delivered by power operation of the conveyer to a location opposite the work station 5. A drawer on a suspension mechanism forming a part of any pan-drawer assembly delivered to the work station may be moved manually between retracted and an extended position such as shown in dot-dash lines at 19 in FIG. 2, and likewise may be moved manually from extended position to a retracted position located in the path of the orbit of travel, such as shown in the full line position of pans 10 in FIG. 2. Also, any drawer on any pan-drawer assembly at any other location accessible at the access opening 3 of FIG. 2 may be moved manually between extended and retracted positions.

Alternatively, a drawer of a pan-drawer assembly located at the work station 5 may be moved between extended and retracted positions by power mechanism and automatic controls of the general type shown in said application Serial No. 446,682.

In accordance with the invention, the improved drawer-moving mechanism for the power ejection and retraction movement of any drawer located at work station 5 is constructed and operated as described below.

Figures 1, 2:
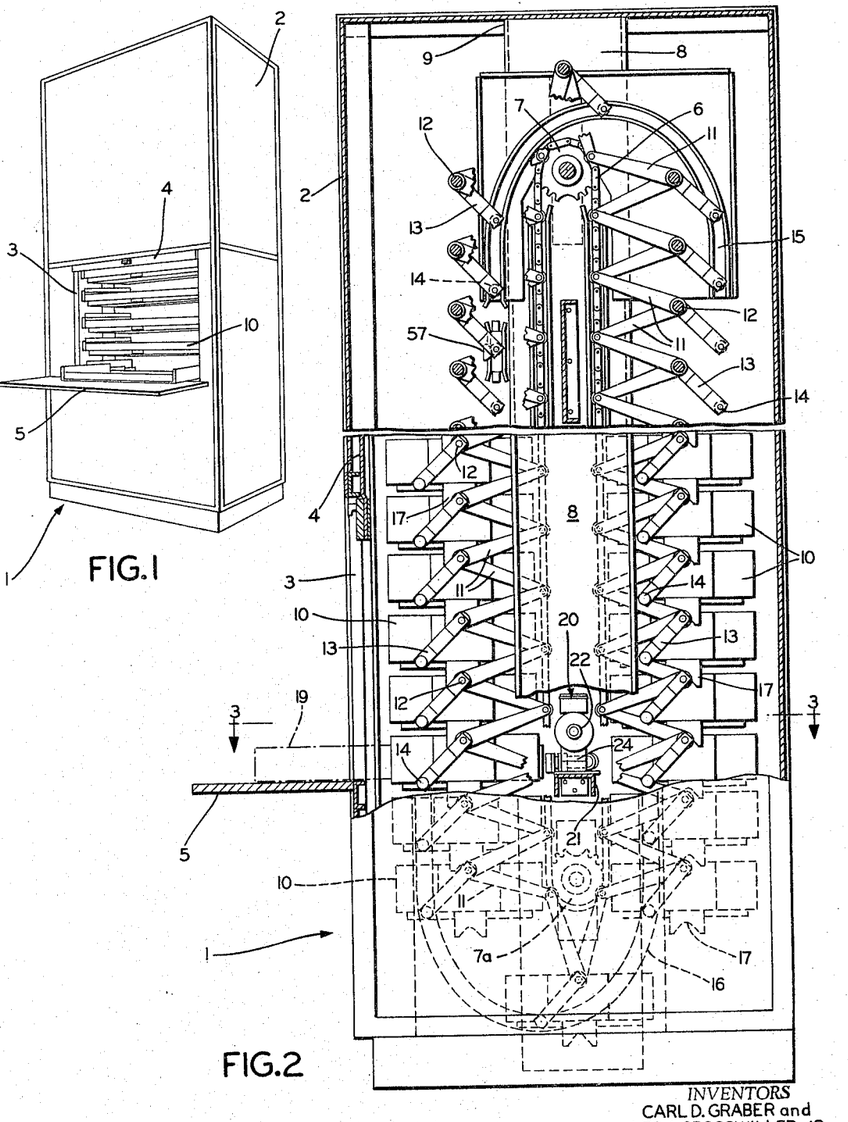
FIGURE 1 is a perspective view of a power file equipped with the improved ejector construction.
FIG. 2 is an enlarged side elevation with parts broken away and in vertical section at various locations looking from the right side of FIG. 1, showing the pans in full lines in one sectional portion, and showing the pan level control switch in full lines at another sectional portion.

The improved drawer-moving mechanism generally indicated at 20 is located in the limited space available between the rear or right of the pans 10 in the flight of travel at the left of FIG. 2 and the front or left of the pans in the flight of travel at the right of FIG. 2. The mechanism 20 is mounted and supported on channel member 21 (FIGS. 3 and 4) extending between upright support members 8 at either end of power file 1 within cabinet or housing 2.

The drawer-moving mechanism 20 preferably includes a power operated reversing motor 22 mounted on base plate 23 which in turn is bolted to channel support member 21. Motor 22 through reduction gears in gear box 24 drives shaft 25 in either direction. An oscillating crank arm 26 is fixed to shaft 25 and its free end is pivotally connected at 27 to connecting rod 28 pivotally connected at 29 with a post 30 mounted on slide member 31. Slide member 31 is slidably mounted endwise in slide guide channel 32 also mounted on base plate 23 between limits of travel approximately equal to the distance through which any drawer moves between retracted and ejected positions on its suspension on any pan 10.

Figure 3:
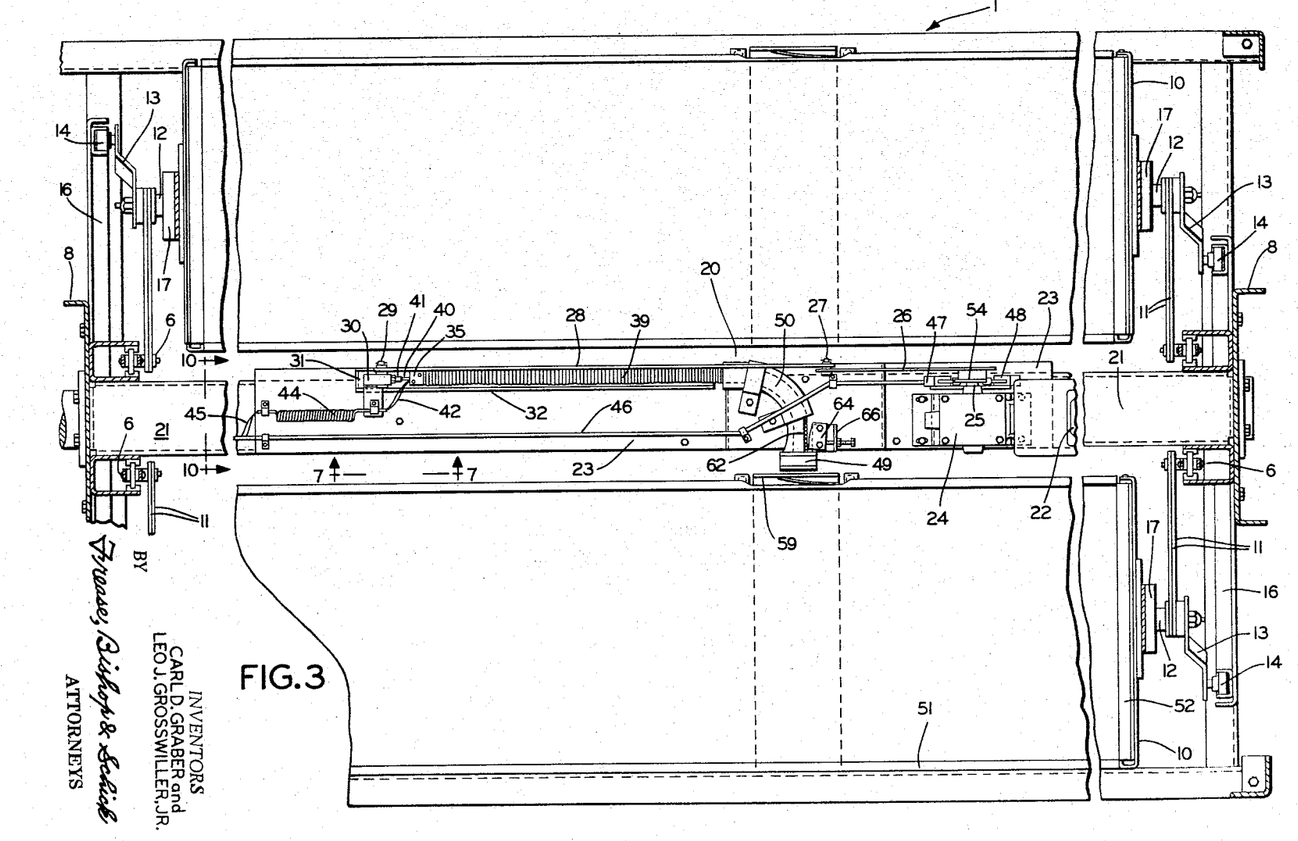
FIG. 3 is a plan section view of the file taken on the line 3—3, FIG. 2, showing a pan at the work station with the drawer thereon in closed position and showing the general location of the improved drawer-moving mechanism, certain of the parts being broken away.
Figure 4:
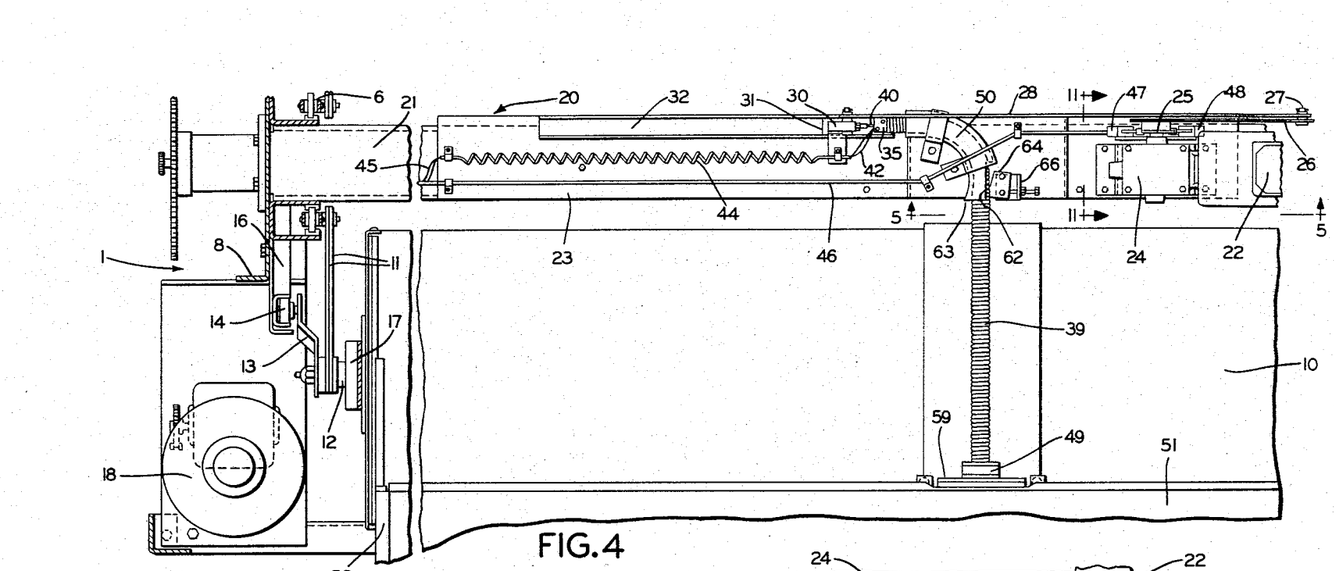
FIG. 4 is a view similar to a portion of FIG. 3 but showing a drawer and the drawer-moving mechanism in ejected position.
Figure 5:
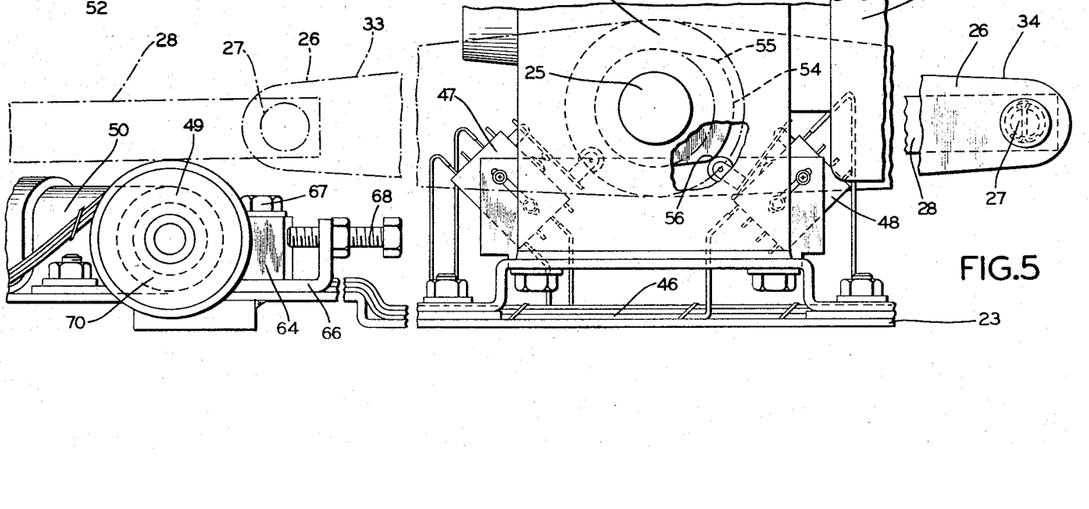
FIG. 5 is a fragmentary view on an enlarged scale with parts broken away looking in the direction of the arrows 5—5, FIG. 4.
Figure 6:
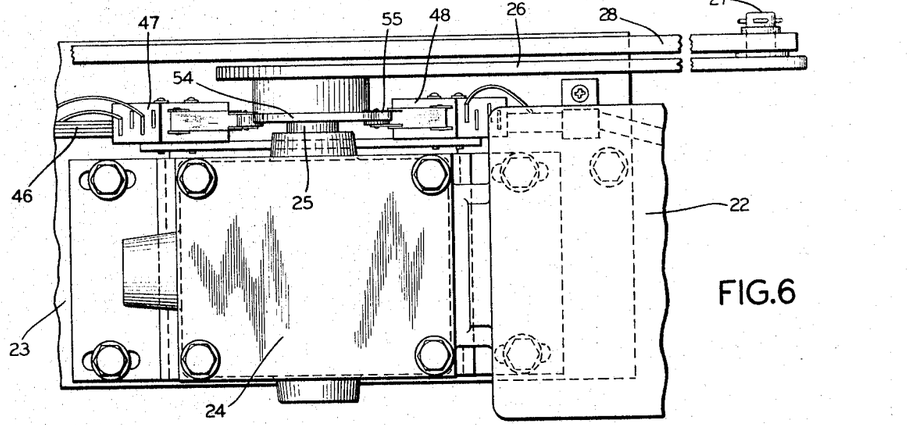
FIG. 6 is a plan view of certain of the parts shown in FIG. 5.

Whenever motor 22 is energized, oscillating crank arm 26 rotates between the drawer retracted position shown in FIG. 3 and the drawer extended position shown in FIG. 4, the retracted position of crank arm 26 being shown in dot-dash lines in FIG. 5 at 33 and in extended position in full lines at 34.

Figure 7:
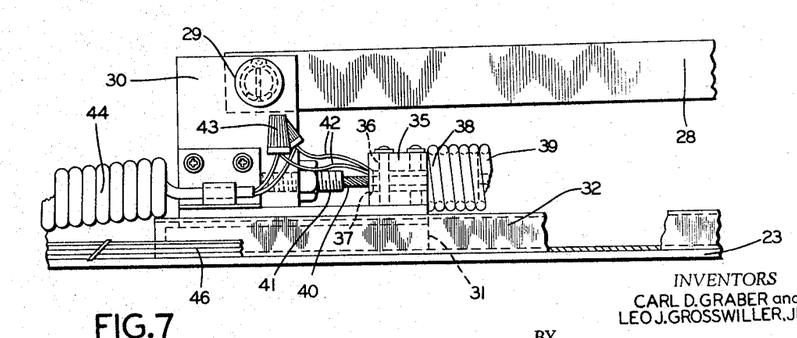
FIG. 7 is an enlarged fragmentary view of the slide bar and thrustor and connecting rod connections looking in the direction of the arrows 7—7, FIG. 3.
Figure 8:
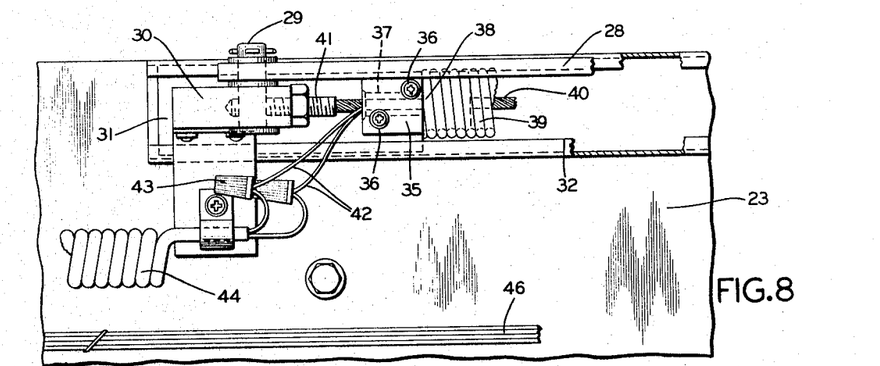
FIG. 8 is a plan view of certain of the parts shown in FIG. 7.

A block 35 mounted by screws 36 (FIGS. 7 and 8) on the right-hand end of slide member 31 is provided with a central opening 37 and is connected with an end 38 of thrustor spring 39. A tension cable 40 extends through opening 37 and is clamped at 41 to slide member post 30. The ends of two wires of a power supply cable 42 which also runs through opening 37 and centrally through thrustor spring 39 are preferably connected at 43 with an extensible coil cable 44 connected through leads 45 (FIG. 3) with control means and a source of power. Leads 46 also extending to the control means and source of power are preferably carried along base plate 23 to motor 22 and limit switches 47 and 48, associated with drive shaft 25 and crank arm 26.

Tension cable 40 and electric cable 42 extend through thrustor spring 39. The other end of tension cable 40 is fixed to a member carrying electromagnet 49 to which power cable 42 is electrically connected for energizing the magnet. The extended end of thrustor spring 39 also is fixed to the member carrying electromagnet 49. The directions in which thrustor spring 39 extend are guided by curved guide sleeve 50 mounted on base 23 so that thrust or movement of slide member 31 may be transmitted around a bend or corner from slide member 31, which moves parallel with the file pans 10, through thrustor spring 39 to magnet 49 in a direction perpendicular to the pans 10.

Each file pan 10 mounted on the conveyer has a drawer 51 mounted by a usual suspension 52 on the pan so that the drawer 51 may be moved by power to an extended position, as indicated at 19 in FIG. 2, and as also is shown in FIG. 4, with a selected pan 10 located opposite the work station. Drawer movement by power between the positions shown in FIGS. 3 and 4 is accomplished through movement of slide member 31 which transmits thrust or pull to any drawer 51 through thrustor spring 39 and tension cable 40. Coupling connection is made or released between thrustor spring 39 and drawer 51 by energizing or deenergizing magnet 49. When the parts are in the position shown in FIG. 3, magnet 49 is always deenergized. When slide member 31 moves away from the "home" or "retracted" or "in" position of FIG. 3, the magnet 49 is energized.

Thrustor spring 39 preferably is wound with an initial tension so that it acts as a column in extending forwardly out of guide 50 as shown in FIG. 4. Spring 39 acting as a column transmits thrust to a drawer 51 from the slide member 31 when the latter is moved from the retracted position of FIG. 3 to the extended or ejected or "out" position of FIG. 4.

During return movement of a drawer 51 from "out" position (FIG. 4) to "in" position of FIG. 3 with the magnet 49 energized and thereby connected with drawer 51, spring 39 initially is stretched slightly in length and the tension cable 40 then takes over and transmits tensional pull between magnet 49 and slide member 31.

The driving arrangement between motor 22 and slide member 31, through crank arm 26 and connecting rod 27 and by reversing movement of motor 22 provides for slow-fast-slow movement of slide member 31 in either direction between the limits of drawer movement. This is illustrated diagrammatically in FIG. 12 wherein the retracted and extended positions of crank arm 26 are indicated at 33 and 34 and wherein the rotary movement of crank arm 26 from a retracted position 33 at rest to an extended position 34 at rest transmits rectilinear movement to slide member 31 through connecting rod 28 at varying speeds. These varying speeds are represented by the curve 53 which may approximate the shape of a portion of a sine curve. Speed of movement from the at rest position increases gradually and gently until maximum speed is reached when crank arm 26 is midway between positions 33 and 34. Then the speed drops off and slide 31 comes to a stop gently at the end of any oscillation of crank arm 26.

The particular slide bar and crank arm and thrustor spring and magnet coupling arrangement and its movement in the manner described, enables the magnet to be energized and held coupled with a drawer 51, and any drawer 51 to be moved, carrying twice the drawer load, but with the expenditure of the same amount of energy, than heretofore was possible with prior constructions.

A control cam 54 preferably is mounted on drive shaft 25 having lobes 55 and 56, respectively, engageable with limit switches 47 and 48 which are connected in the control circuit for reversing motor 22. Shaft 25 and crank arm 26 and cam 54 are shown in full lines in the extended position of thrustor spring 39 in FIG. 5; and cam lobe 56 has tripped the roller of limit switch 48 to actuate the limit switch stopping movement of motor 22 with the drawer in extended position.

Upon rod movement of crank arm 26 to retracted position 33, cam lobe 55 will trip the roller of and actuate limit switch 47 to stop the motor 22 when the drawer has reached retracted position.

Referring to FIG. 2, a level switch 57 is mounted adjacent the path of conveyor travel for actuation by one of the stabilizing rollers 14 of the pan-drawer assemblies to insure that a pan is at a proper level at work station 5 to be ejected or moved to an "out" position 19. Details of the level switch construction and operation are shown in said application Ser. No. 446,682. This level switch 57 is also connected in the control means for the operation of conveyer drive motor 18.

Referring to FIGS. 13 to 16, each pan 10 carries a drawer 51 for movement between retracted and extended positions on suspension mechanism 52 and rollers 58. A movable drawer handle 59 is preferably provided for each drawer 51 slidably mounted on the drawer and spring-biased normally rearwardly of the drawer to the position shown in FIG. 13.

Figures 14, 15:
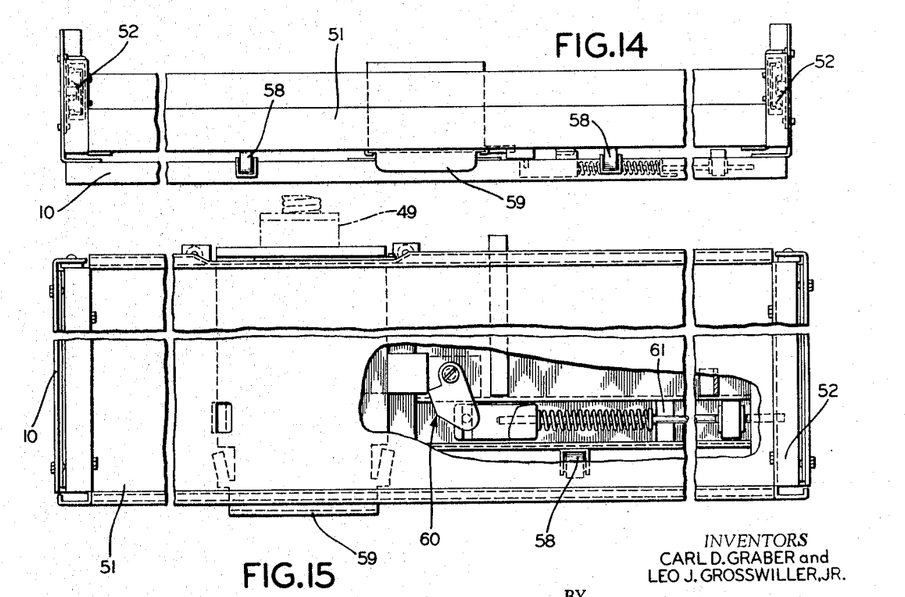
FIG. 14 is a front view of the parts shown in FIG. 13.
FIG. 15 is a further enlarged view of the parts shown in FIG. 13 with parts broken away illustrating the latch mechanism for the drawer in unlatched position after initial operation of the drawer-moving mechanism shown in dot-dash lines.
Figure 16:
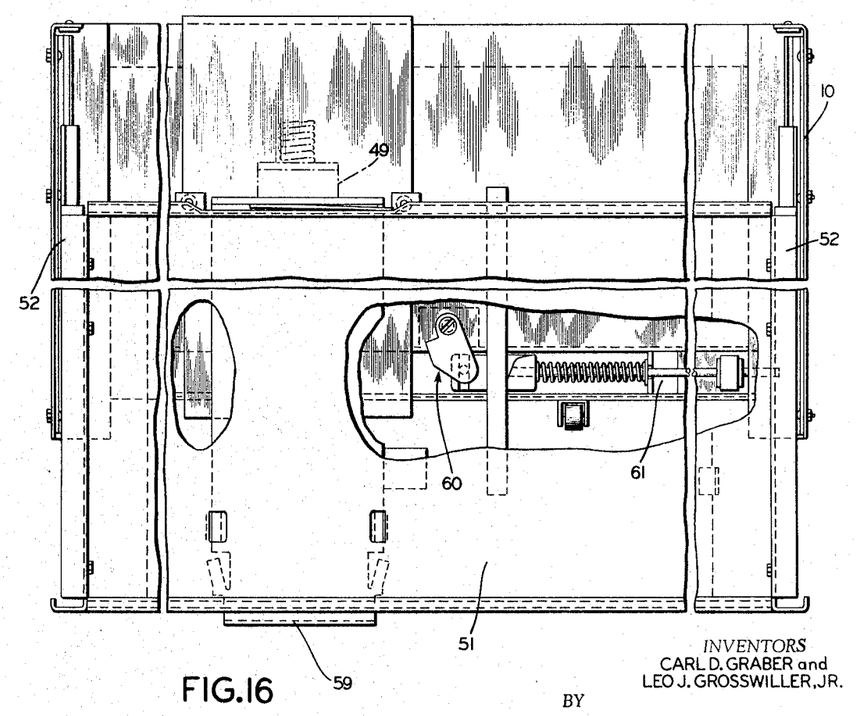
FIG. 16 is a view similar to FIG. 15 illustrating the drawer during movement from retracted to ejected position.
Figure 17:
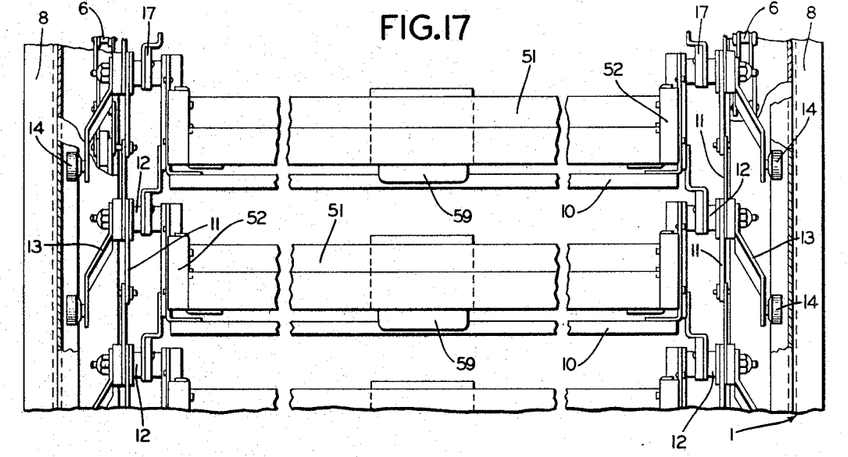
FIG. 17 is a fragmentary elevational view with parts broken away and in section illustrating several of the pans on the conveyer looking toward the left side of the middle portion of FIG. 2.

Handle 59 may be pulled forwardly manually on any drawer accessible at the access opening 3 to release the drawer latch and extend the drawer outwardly. When the drawer is moved by power operation of thrustor 39, magnet 49 initially engages handle member 59 pushing it forwardly of the drawer as shown in FIG. 15, unlatching the drawer latch mechanism generally indicated at 60 which then permits further movement of the drawer to extended position as shown in FIG. 16. The latch mechanism 60 also may include an actuator rod 61 coordinated with a safety mechanism to prevent movement of the conveyer whenever any drawer is unlatched. Safety mechanism of this general type is shown in Patent No. 3,166,366.

Figures 9, 10, 11, 12:
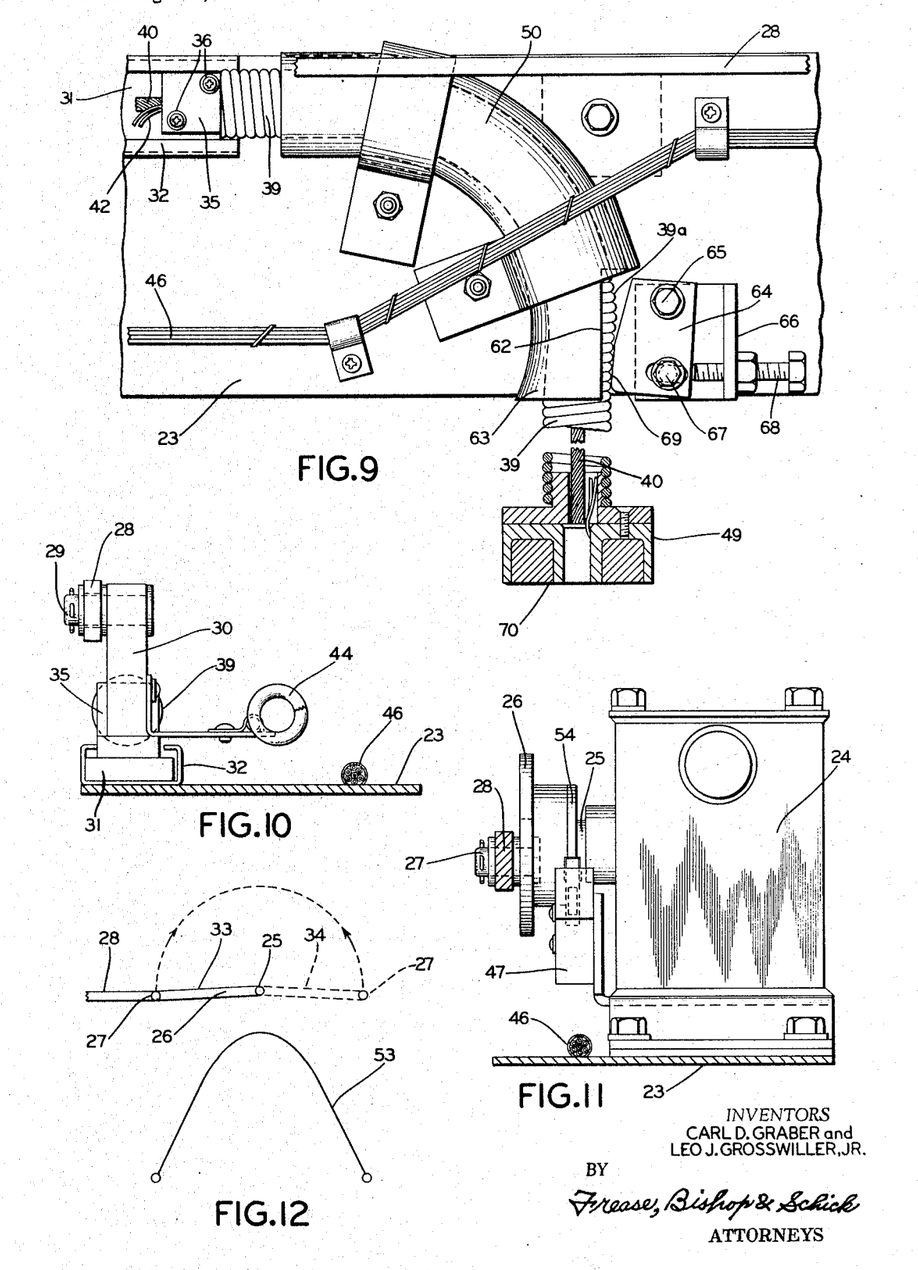
FIG. 9 is an enlarged fragmentary plan view with parts broken away of a portion of the thrustor moving around a corner as shown in FIGS. 3 and 4, and illustrating the thrustor directing shoe.
FIG. 10 is an end sectional view of the improved drawer-moving mechanism looking in the direction of the arrows 10—10, FIG. 3.
FIG. 11 is a sectional view similar to FIG. 10 looking in the direction of the arrows 11—11, FIG. 4, showing the motor drive, connecting rod and crank for the drawer-moving mechanism.
FIG. 12 is a diagrammatic view illustrating the speed characteristics of the improved drawer-moving mechanism.
Figure 13:
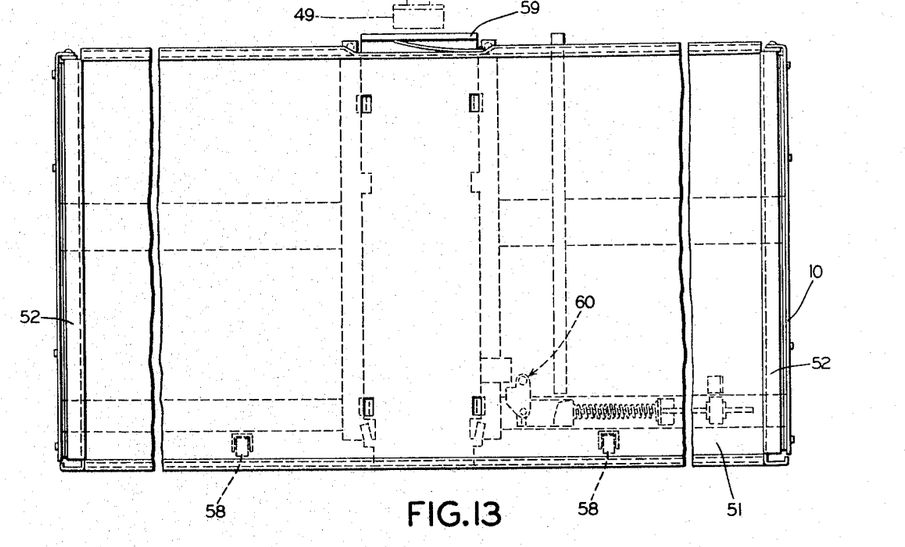
FIG. 13 is an enlarged plan view of a drawer on a pan with the drawer latched in closed position and the drawer-moving mechanism illustrated in dot-dash lines in fully retracted position.

Referring to FIGS. 3, 4, and 9, the curved guide sleeve 50 has a cutout 62 adjacent the end 63 thereof from which the thrustor spring 39 moves in ejecting or retracting a drawer 51 coupled with magnet 49 carried at the end of thrustor spring 39. This cutout 62 exposes a moving portion 39a of thrustor spring 39 as it leaves the curved guide 50 and is projected in a straight line. A thrustor directing shoe 64 is mounted for pivotal movement about a bolt 65 which also clamps the shoe 64 against an L-shaped bracket 66 mounted on base plate 23. Shoe 64 may be moved arcuately about pivot bolt 65 and also is clamped in an adjusted position by clamping bolt 67. The adjustment of shoe 64 may be accurately controlled by adjusting screw 68.

Adjustment of shoe 64 accurately locates the shoe face 69 so that the direction of movement of thrustor spring 39 and, therefore, the orientation of the face 70 of magnet 49 may be controlled. It is important that the face 70 of magnet 49 be located parallel with the rear face of any movable drawer handle 59 for efficient and effective magnetic engagement between magnet 49 and any handle 59. In this manner movement of the thrustor spring 39 during ejection and retraction may be accurately controlled by final adjustment of shoe 64 regardless of inaccuracies in the manufacture and assembly of the guide shoe 50 on base plate 23.

The location of the improved drive mechanism for power operated ejection and retraction movement of the thrustor spring to eject or retract a drawer between the flights of travel of the conveyer mechanism is rendered possible by providing for movement not only of slide member 31 parallel with the axes of the orbital path of conveyor travel, but also movement of the connecting rod 28 and crank arm 26 parallel with said axes of the orbital path of conveyor travel. In this manner gently changing slow-fast-slow rectilinear movement is imparted to the thrustor spring by mechanisms located within the limited space available between the paths of travel of the flights of conveyer movement.

Accordingly, the improved construction provides a simple and practical drawer-moving mechanism for power files of the types described which eliminates complicated constructions heretofore used; which eliminates abrupt speed changes during power operated ejection and retraction of conveyer drawers; which enables the minimum expenditure of energy in moving heavily loaded drawers; which may be located and operated within the small and confined space available in such power files without altering the file size; which provides for smooth and gentle acceleration, then rapid movement and then smooth and gentle deceleration during drawer movement; which provides a construction that avoids the various difficulties and eliminates the problems heretofore encountered in the art; and which provides a new construction achieving the objects set forth and accomplishing the many new functions and results described thereby solving problems and satisfying needs existing in the art.

In the foregoing description certain terms have been used for brevity, clearness and understanding, but no unnecessary limitations are to be implied therefrom beyond the requirements of the prior art, because such terms are used for descriptive purposes and are intended to be broadly construed.

Moreover, the description and illustration of the invention is by way of example and the scope of the invention is not limited to the exact structures shown, because the various parts, components and mechanisms may be varied to provide other structural embodiments, without departing from the fundamental concepts, aspects, and principles of the invention.

Having now described the features, discoveries, and principles of the invention, the construction, assembly, characteristics, operation and use of a preferred form thereof, and the advantageous, new and useful results obtained thereby; the new and useful discoveries, principles, apparatus, combinations, parts, elements subcombinations, structures and cooperative relationships, and mechanical equivalents obvious to those skilled in the art are set forth in the appended claims.

We claim:
1. Power-operated, ejector-retractor construction for moving the drawers of a power file of the type in which a plurality of pans are mounted on an endless conveyer mechanism carried by support means for movement in either direction in a continuous orbit of travel having at least one flight of travel in a plane extending parallel with the orbital axes and any selected pan is delivered by conveyor drive power means to a predetermined work station location, and in which a drawer is supported on each pan as a pan-drawer assembly on suspension mechanism which permits the drawer to be moved between ejected and retracted positions through a file access opening provided in the file case at said work station location; the construction including in combination, drawer-moving mechanism, means mounting said drawer-moving mechanism on the file support means adjacent the work station and between flights of orbital conveyer travel; the drawer-moving mechanism including slide bar means movable generally in a direction between home and extended positions parallel with the axes of the orbital path of conveyor travel, means for imparting generally accelerating and decelerating slow-fast-slow movement in either direction to the slide bar means including reversing motor drive means, an oscillating crank operatively connected with the drive means, and a connecting rod pivotally connected with the crank and slide bar means; column-acting, force-transmitting coil spring thrustor means connected at one end to the slide bar means having a magnet adapted for magnetic coupling at its other end with a drawer of any pan-drawer assembly located at said predetermined work station location; means for directing thrust movement of said thrustor magnet in a direction normal to the plane of at least one of the flights of conveyer travel; and control means for operating the reversing motor drive means.

2. The construction defined in claim 1 in which the reversing motor drive means includes a drive shaft to which the oscillating crank is connected and a limit switch actuator cam on the drive shaft; and in which the control means includes limit switches operatively associated with said cam.

3. The construction defined in claim 2 in which the cam has first and second lobes; and in which the limit switches comprise first and second limit switches operatively engageable respectively with said first and second cam lobes.

4. The construction defined in claim 1 in which said oscillating crank and said connecting rod during crank oscillation move in planes respectively parallel with the axes of the orbital path of conveyer travel.

5. The construction defined in claim 1 in which the means for directing thrust movement of said thrustor magnet includes a curved guide member having an exit end from which the spring thrustor means is projected when the slide bar means moves to extended position, and a guide shoe located adjacent the path of movement of said spring thrustor means at the exit end of the curved guide member.

6. The construction defined in claim 5 in which the guide shoe is adjustable to accurately direct thrust movement of the thrustor magnet in a direction normal to the plane of at least one of the flights of conveyer travel.

References Cited by the Examiner

UNITED STATES PATENTS

| | | | |
|---|---|---|---|
| 3,198,894 | 8/1965 | Krug | 200—11 |
| 3,199,658 | 8/1965 | Graber et al. | 198—137 |
| 3,235,319 | 2/1966 | Anders et al. | 312—223 |

CLAUDE A. LE ROY, *Primary Examiner.*

CHANCELLOR E. HARRIS, *Examiner.*